United States Patent [19]
Homel

[11] Patent Number: 5,176,315
[45] Date of Patent: * Jan. 5, 1993

[54] BOOK RECEPTACLE WITH COLLAPSIBLE CONTAINER

[75] Inventor: Randall J. Homel, Green Bay, Wis.

[73] Assignee: The Highsmith Co., Inc., Fort Atkinson, Wis.

[*] Notice: The portion of the term of this patent subsequent to Jan. 21, 2009 has been disclaimed.

[21] Appl. No.: 822,436

[22] Filed: Jan. 17, 1992

Related U.S. Application Data

[63] Continuation-in-part of Ser. No. 559,729, Jul. 30, 1990, Pat. No. 5,082,171.

[51] Int. Cl.$^5$ .................................................. B65D 91/00
[52] U.S. Cl. ........................................... 232/43.2; 220/9.1; 220/404
[58] Field of Search ............... 232/43.1, 43.5, 44, 232/47; 383/2, 120; 220/8, 666, 9.1, 403, 404, 409, 85 B, 93

[56] References Cited

U.S. PATENT DOCUMENTS

| | | | |
|---|---|---|---|
| 689,678 | 12/1901 | Lane | 220/9.1 |
| 1,148,949 | 8/1915 | Benjamin | 220/9.1 |
| 1,248,584 | 12/1917 | Williams | |
| 1,767,274 | 6/1930 | Broderick | |
| 2,319,872 | 5/1943 | Leonard | 220/93 |
| 2,458,868 | 1/1949 | Miller | 220/18 |
| 2,581,621 | 1/1952 | Behrens et al. | 232/42 |
| 2,617,584 | 11/1952 | Behrens | 232/44 |
| 3,223,432 | 12/1965 | Nicolaci | 280/79.2 |
| 3,310,089 | 3/1967 | Silverman | 220/9.1 |
| 3,495,762 | 2/1970 | Verbic | 229/53 |
| 3,746,066 | 7/1973 | McIntyre | 150/33 |
| 3,799,430 | 3/1974 | Huguenin | 232/43.2 |
| 3,863,561 | 2/1975 | Karls | 100/53 |
| 3,976,345 | 8/1976 | Walters | 312/333 |
| 3,981,436 | 9/1976 | Neal | 232/17 |
| 4,055,201 | 10/1977 | Fowler et al. | 139/421 |
| 4,176,610 | 12/1979 | Markham et al. | 109/59 |
| 4,278,163 | 7/1981 | Tomich | 193/34 |
| 4,300,611 | 11/1981 | Silverman | 220/9.1 |
| 4,517,901 | 5/1985 | Clark | 109/19 |
| 4,573,416 | 3/1986 | Masachika | 109/66 |

FOREIGN PATENT DOCUMENTS 756371 10/1965 Canada .................................... 109/9

OTHER PUBLICATIONS

Books, Trucks and Library Equipment, pp. 201-202, Highsmith Catalog.
Kingsley Library Equipment Catalog, Kingsley Catalog, p. 174.
Kingsley Library Logo Book Return.
Gaylord Book Return.
Highsmith, The Fargo Library-AL12, 1190 Jun. 1990 Handout.
"Book Returns, Trucks and Library Equipment," Highsmith Catalog, Jan. 1990.
Highsmith Catalog, pp. 211-212, Aug. 1990.

Primary Examiner—Renee S. Luebke
Assistant Examiner—F. Saether
Attorney, Agent, or Firm—Lathrop & Clark

[57] ABSTRACT

A book receptacle mounted on wheels forms a movable book storage container. Within the book receptacle is a collapsible container with an upper peripheral edge which is affixed to the upper edge of the support structure of the book receptacle. The collapsible container in an uncollapsed state substantially fills the volume defined by the support structure. A load-responsive support, which is preferably an elastic cord, provides load-responsive support between a first attachment point located at the bottom of the collapsible container and a second attachment point located on the support structure and spaced from the first attachment point so that the collapsible container is held in a substantially collapsed condition when the container is empty and expands to substantially fill the volume defined by the support structure as additional books are added.

9 Claims, 7 Drawing Sheets

BOOK RECEPTACLE WITH COLLAPSIBLE CONTAINER

This application is a continuation-in-part of application Ser. No. 07/559,729, filed Jul. 30, 1990, now U.S. Pat. No. 5,082,171.

FIELD OF THE INVENTION

This invention relates to book returns for receiving and storing books, and more particularly to movable book receptacles or trucks.

BACKGROUND OF THE INVENTION

Book returns are used by libraries and other institutions which lend books and other materials which are required to be returned within a set period of time. Book returns are useful where it is desirable to allow the borrower of materials to return them when the library or institution is closed. Book returns also make the return of materials more convenient by allowing books and materials to be returned without entering the building in which the library or institution is located. For even greater convenience, book returns may be located adjacent to a driveway or street facilitating the return of materials by a driver or passenger of a vehicle without leaving their vehicle.

An effective book return should achieve two integrated and related functions. First, it should receive the book or returned item by means of a door and pass it through to a storage container or area in such a way that it cannot be retrieved by the depositor or any unauthorized person. Known book returns employ sector-shaped doors which are pivotally mounted within a casement and are rotatively movable from an open to a closed position so that a book may be inserted into the open door, then dropped into the storage area when the door is closed. Some returns have a pivotally-mounted gate covering the rear discharge opening such that the gate can be held closed by a guide surface within the casement when the pivotally movable door is opened for deposit, thereby preventing access to the book storage area when the book deposit door is open. Although access to the interior is prevented, books may continue to be placed within the deposit door after the storage capacity of the container has been exhausted. Books placed within the door, but blocked from admittance to the container by the books within, remain accessible to weather damage or pilferage.

A book return should also prevent damage to the books when they drop into the storage container or area after passing through the depository door. If the books fall more than a foot or so the force of impact may damage them. One mechanism for maintaining a short drop distance is a self-lowering container tray, suspended by metal springs from the container rim. In this way this mechanism gives the storage container a relatively shallow depth when books first are loaded therein, but as more books are loaded the weight of the books forces the tray down, thereby providing more room for subsequently loaded books.

Frequently books, or the return cards associated with them, drop down between the movable container tray and the side walls of the container. Exposed springs which are used to support the container tray may trap the corners of books and cards. To retrieve books and cards trapped beneath the shelf, librarians must reach through a side hole, a process which is cumbersome and which may result in fingers pinched in the springs. Furthermore, container volume which would otherwise be available for storing books is occupied by the springs which extend beneath the tray.

In order to most efficiently utilize the space available in the book storage container, it is desirable that the mechanism for lowering the bottom of the container be as space efficient as possible.

A book deposit is needed which is inaccessible to further deposits when the book container is full and which effectively utilizes the book container capacity while precluding the trapping of books or cards in the container.

SUMMARY OF THE INVENTION

The book return of the present invention has a book storage container which has a support structure which is open at the top with a peripheral edge. A collapsible container with a bottom is open at the top and has an upper peripheral edge which is affixed to the upper edge of the support structure. The collapsible container in an uncollapsed state substantially fills the volume defined by the support structure. A load-responsive support, which is preferably an elastic cord provides load-responsive support between a first attachment point located at the bottom of the collapsible container and a second attachment point located on the support structure and spaced from the first attachment point so that the collapsible container is held in a substantially collapsed condition when the container is empty and expands to substantially fill the volume defined by the support structure as additional books are added. The book return also has a casement which defines a door compartment having a frontal access opening and a rear discharge opening. A sector-shaped door has a book guide surface and is attached to the casing about a horizontally-pivoted axis near the bottom of the casing between the frontal access opening and the rear discharge opening. The door is pivotal between a closed and an open position. A gate is horizontally pivotally attached to the rear of the door at the top of the gate, such that the gate covers the rear discharge opening. A guide member is attached to the bottom of the gate such that the guide member will be displaced upwardly by a book deposited in the container when the book container is full. An inner guide surface is connected to the casing and spaced from the door and is adapted to restrict access through the gate by action on the guide member, when the door is opened. An outer guide surface is connected to the casing opposite the inner guide surface. The outer guide surface constrains the upwardly displaced guide member as the sector-shaped door is opened to prevent the door from opening, such that the door will freely open when the container is not filled with books but will be prevented from opening when the container is full.

It is an object of the present invention to provide a book return which locks against deposits when the book container is full.

It is a further object of the present invention to provide a book receiving container in which the books are fully contained by a bag and cannot fall out.

It is also an object of the present invention to provide a self-lowering bottom in a book container wherein the support mechanism for the bottom of the container is not exposed to the books.

It is yet another object of the present invention to provide a book storage container with more usable volume.

It is yet a further object of this invention to reduce the noise associated with a book deposit through the use of a book container wherein no metal is contacted by the books when they drop into the storage container.

It is also a further object to contain the springs or elastic members which support the collapsible bag of a book receptacle isolated from the user.

It is another object of the present invention to provide a book receptacle which functions as a book truck.

Further objects, features and advantages of the invention will be apparent from the following detailed description when taken in conjunction with the accompanying drawings.

DESCRIPTION OF THE PREFERRED EMBODIMENT

Figure 1:
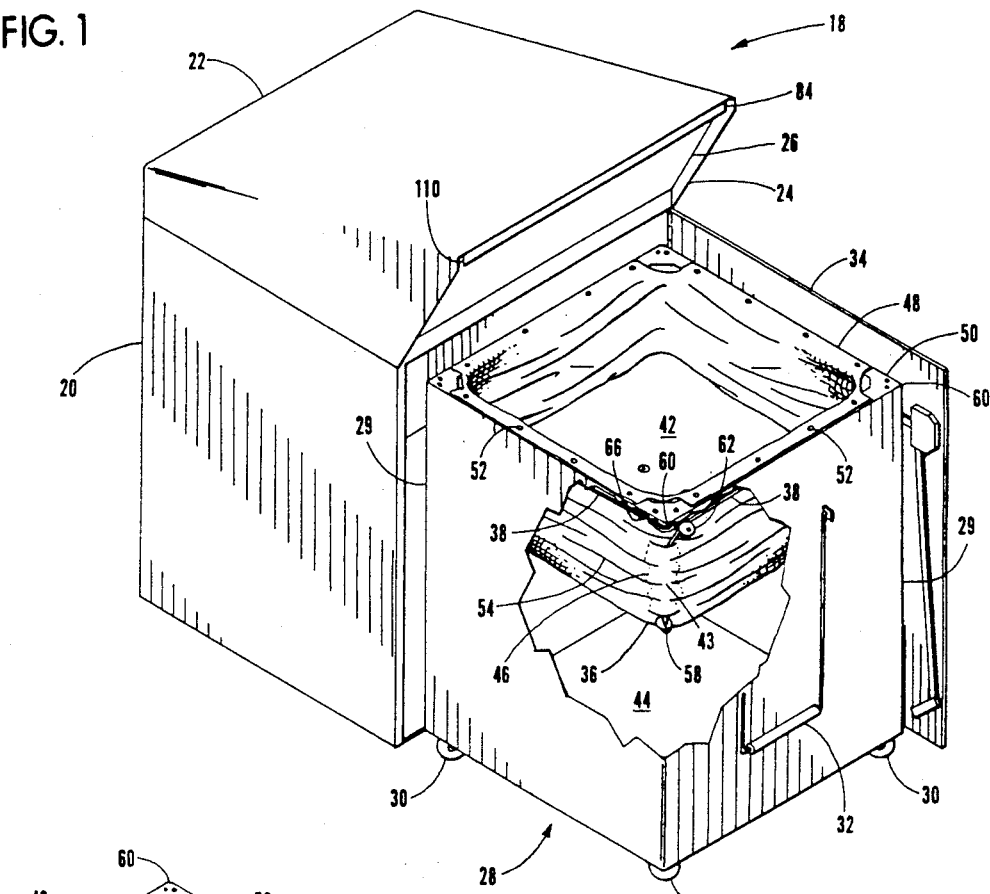
FIG. 1 is a perspective view of the book return of this invention with the book container partially removed and cut away to show a collapsible container therein.

Referring more particularly to FIGS. 1-10 wherein like numbers refer to similar parts, a book return 18 having a chest 20 is shown in FIG. 1. The chest encloses an interior space 100 over which is mounted a casement 22. In the front of the casement 24 is located a sector-shaped door or chute 26 which is pivotally movable from an open to a closed position. A removable book container 28 fits within the chest 20. The book container 28 is preferably rectangular with vertical side walls 29 forming a right prismatic support structure. The book container 28 preferably rides on caster wheels 30 and may be removed from the chest 20 and towed by a handle 32 for ease of moving the books from the book return 18 to the library or institution where they may be recataloged and shelved. The chest door 34 may be locked and so restrict access to the returned books to authorized persons.

Portions of the removable book container 28 are cut away in FIG. 1 to show an inner collapsible container or bag 36. Load responsive supports which are preferably elastic cords 38 support the bottom 42 of the collapsible bag 36, and hold the collapsible bag in a substantially collapsed position when it is not loaded with books. Although elastic cords are preferred, the load responsive means could also be supplied by springs, air pistons, or other equivalent structure.

Figure 2:
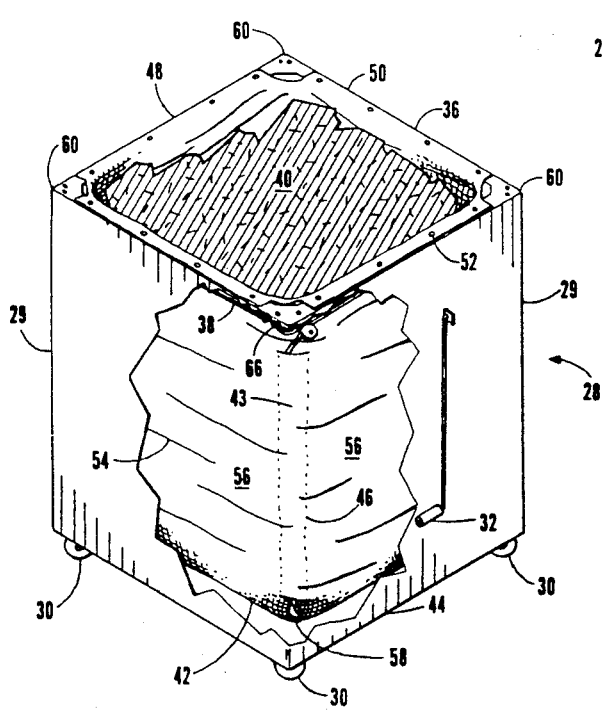
FIG. 2 is a perspective view of the removed book container of FIG. 1 cut away to show the collapsible container in a fully extended position.

When the collapsible bag 36 within the book container 28 is filled with books 40, as best shown in FIG. 2, the weight of the books forces the bottom of the bag 42 to its full extension where it rests closely spaced from or on the bottom 44 of the removable book container 28. The elastic cords 38 respond to the load by lengthening and so allowing the bag 36 to extend until the books resting on the bottom of the bag 42 reach the bottom of the book container 44. Cloth sleeves 46 are formed on the edges 43 of the bag 36 where the sides of the bag 56 meet and through which the elastic cords 38 extend. Because of the sleeves 46, the cords are not accessible from either the inside of the collapsible bag 36 or the outside of the removable book container 28 under normal operation. Thus the cords are not exposed to possible entanglement with the operator or books.

Figure 3:
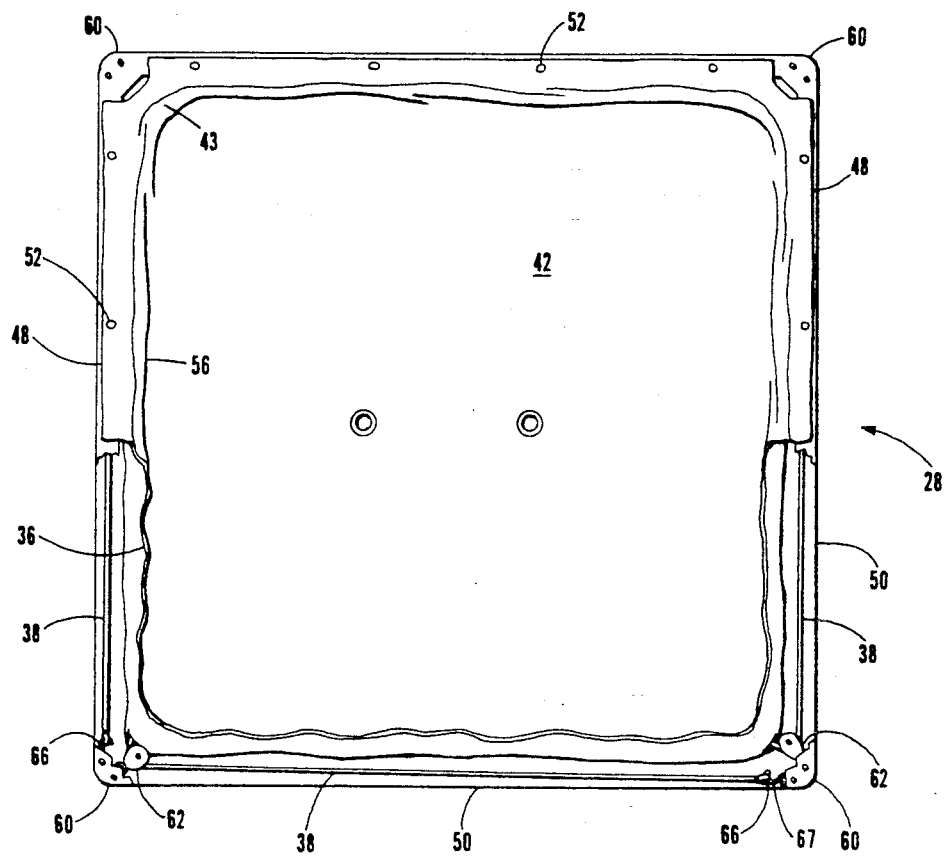
FIG. 3 is a top plan view of the removable book container of the book return of FIG. 1 cut away to show the elastic supports and pulleys of the collapsible container.
Figure 4:
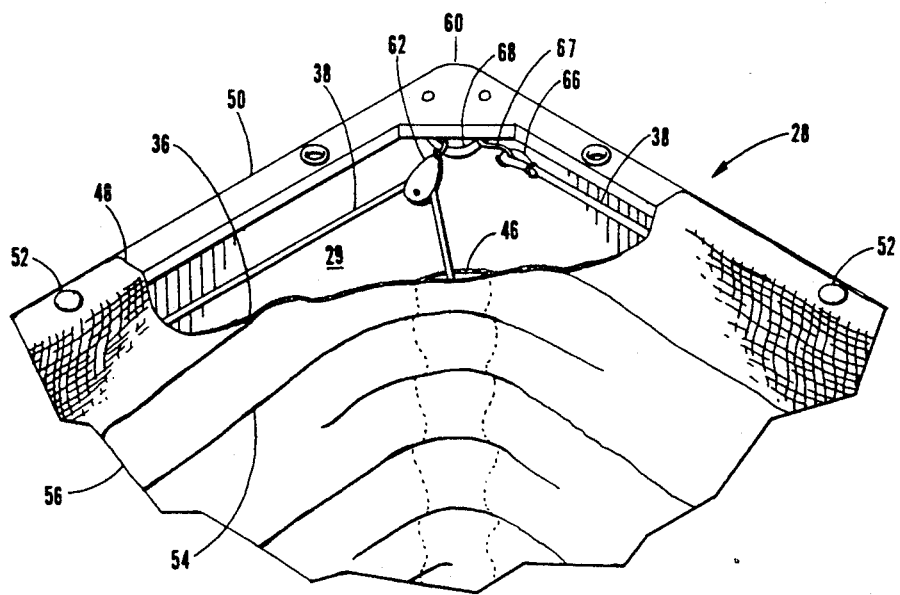
FIG. 4 is a fragmentary perspective view of the elastic support mechanism of the collapsible container of FIG. 3.

As best shown in FIG. 3, the collapsible bag 36 is nested within the removable book container 28 and attached by an upper peripheral edge 48 to the upper peripheral edge of the removable container 50 by an attachment means 52 herein shown as two-part removable snaps. When the bag 36 is empty, as shown in FIGS. 1, 3 and 4, pleats or folds 54 are formed where the walls 56 of the collapsible bag 36 are compressed by the cords 38. The bag 36 is preferably formed of one or more layers of durable fabric such as woven nylon or canvas with reinforcing straps 57 to support the load of the books 40. However, the collapsible container 36 could be constructed of metal, plastic or the like, formed with hinges or accordion folds, so as to make a collapsible container. The bag 36 may be removed from the container 28 as needed for cleaning, maintenance, repair, or replacement.

Figure 5:
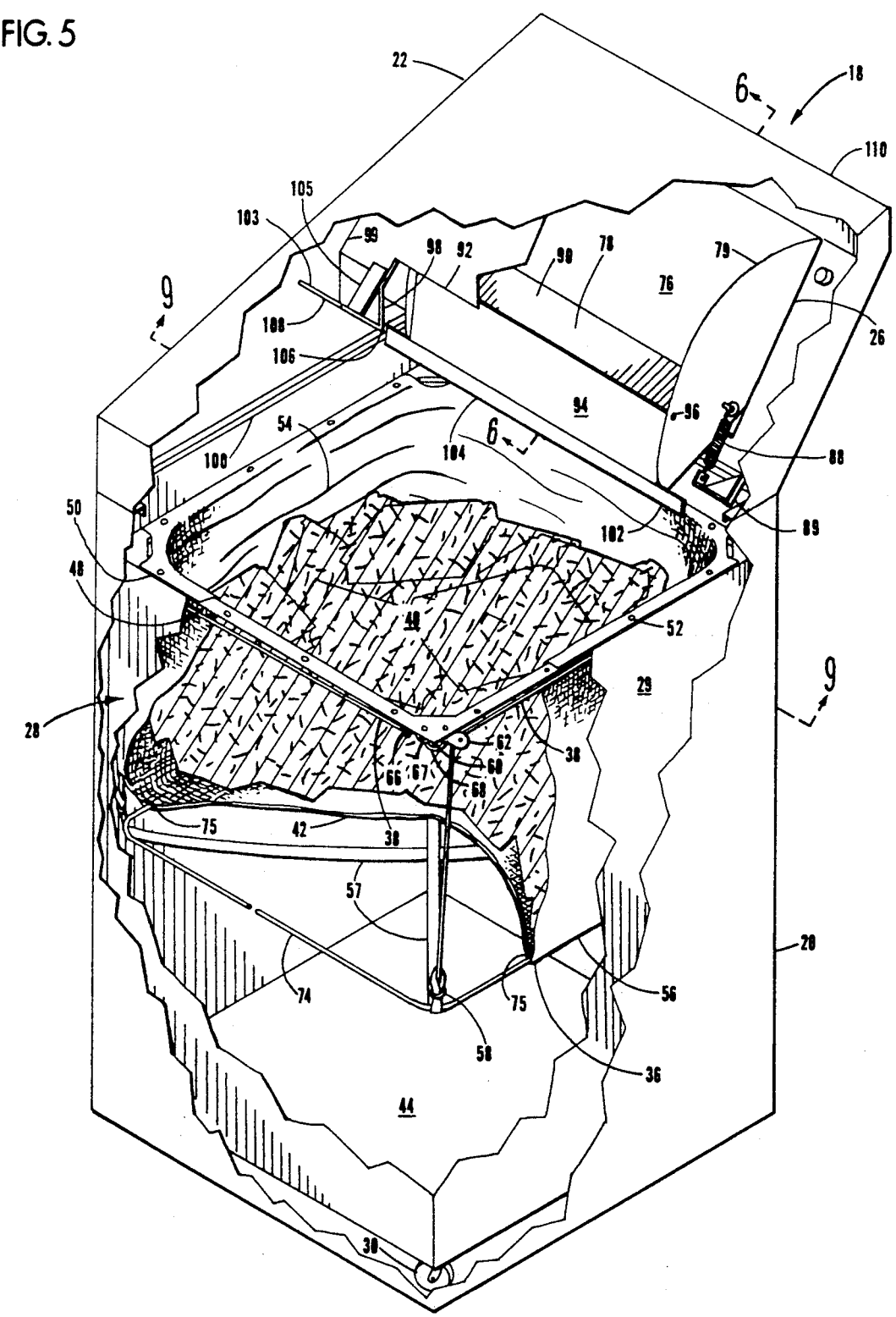
FIG. 5 is a rear perspective view of the book deposit of FIG. 1, with the removable book container fully inserted within the deposit and cut away to show the collapsible book container partially loaded with books.

As shown in the cut-away view of FIG. 4, a cord 38 is connected at each corner 60 of the removable book container 28. As shown in FIG. 5, each elastic cord 38 load responsive support is preferably attached by a square knot at a first attachment point 58 to the looped ends of flexible reinforcing straps 57 which cross and are sewn to the bottom 42 of the bag 36. Each cord 38 travels through a cloth sleeve 46 in the edge 43 of the collapsible bag 36 to a corner 60 of the removable book container 28 where the elastic cord 38 passes through and over a pulley 62 which turns the elastic cord 38 90° parallel to the side wall 29 of the removable book container 28. Where the elastic cord 38 reaches the next adjacent corner 60 of the removable book container 28, it is attached at a second attachment point 66 which is preferably a clip 67 connected to a bracket 68. The second attachment point is spaced a fixed distance from the pulley 62, such that the length of the cord 38 extending between the pulley and the second attachment point remains fixed as the bottom 42 of the collapsible bag 36 is depressed. The pulley block 62 and the clip 67 are preferably attached to a common bracket 68 in each of the corners 60 of the removable book container 28.

The pulleys 62 permit the use of flexible cords of a length greater than the depth of the container 28 hence affording a greater degree of flexible extension for a cord of a particular elasticity. It should be noted that, with the proper elastic material, the cords could alternatively be attached at a second attachment point directly above the first attachment point, eliminating the need for a pulley.

As shown in FIG. 5, the collapsible bag preferably has a rigid bent metal frame 74 installed in a pocket 75 formed by two layers of fabric in the bottom of the collapsible bag 36. The rigid frame 74 holds the bottom of the collapsible bag 36 in an extended position such that it may substantially fill the open area of the removable book container 28. The frame 74, together with the bag bottom 42, forms a resilient bottom 42 to the collapsible bag 36 so that when books fall upon it their fall is cushioned and relatively little noise is produced. As the collapsible bag 36 is loaded with books, the elastic cords 38 lower the bag bottom in response to the load imposed by the books. Thus, when the books fall into the collapsible bag 36, they fall relatively constant and relatively short distances and when the bag 36 is being unloaded, the books further down in the bag are automatically lifted up into reach as the books on top are removed.

Figure 7:
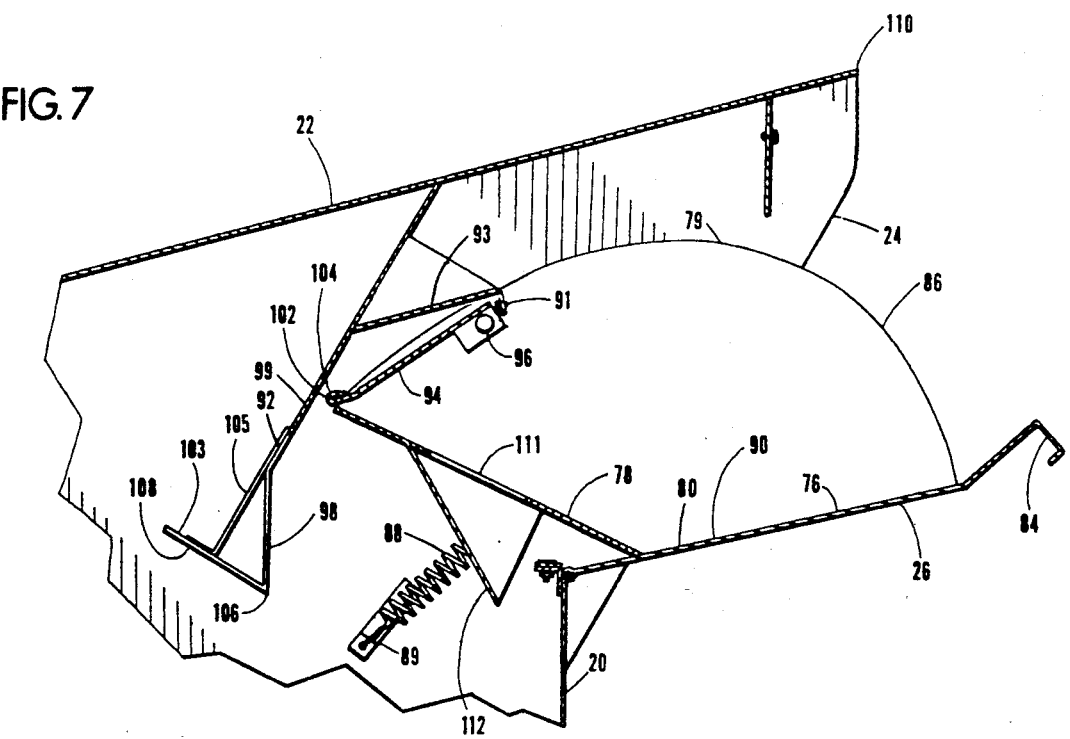
FIG. 7 is a cross-sectional view of the book deposit of FIG. 6 in which the book return door is open.

As shown in FIG. 1, 5 and 7 the casement 22 in which the sector-shaped door 26 is mounted, in the preferred embodiment, has a square base adapted to fit onto the chest 20 so that the casement 22 may be rotated in 90° increments such that the chest door 34 may be installed in any orientation relative to the front of the casement where the front opening 86 into which books 40 are deposited is located. Thus, the front opening 86 and the chest door 34 may be located on the same side (as shown in FIG. 1), or on opposite sides, 90° to the right or 90° to the left. This feature of the book return allows it to be conveniently used near a curb for curbside drop off wherein the books are deposited from the street side, and the removable book container 28 is removed from the opposite side. Where the book return is located for walk up deposits next to a sidewalk, the chest door 34 may be located on the same side as the front opening 86 so that the removable book container 28 can be pulled forward onto the sidewalk.

Figure 6:
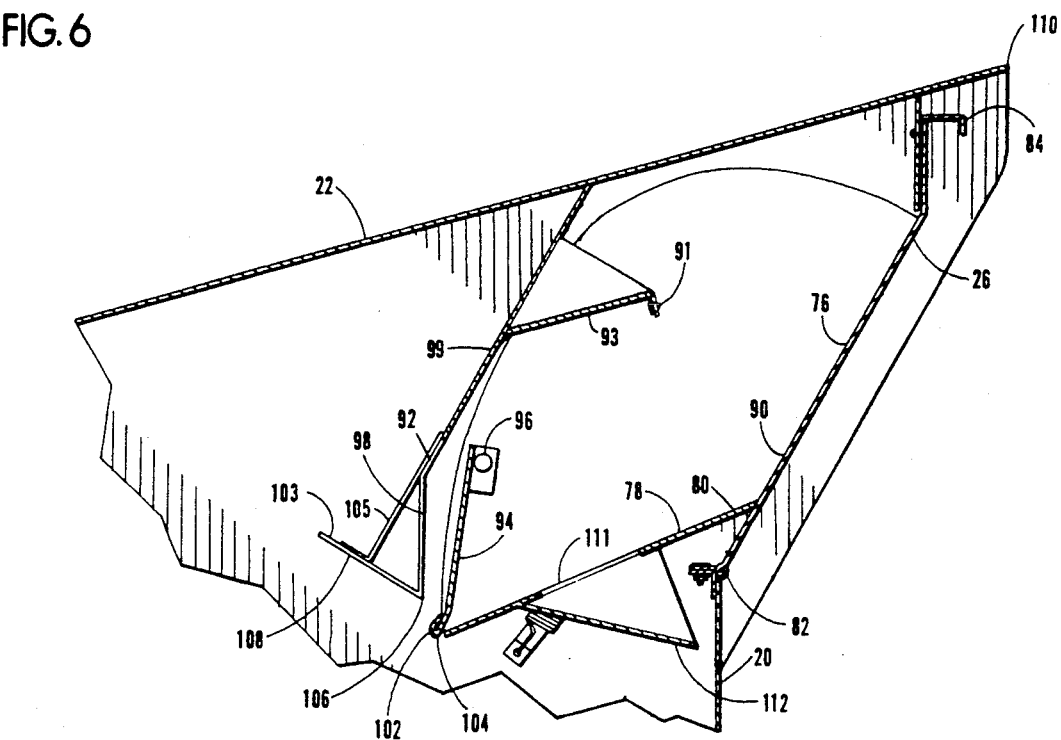
FIG. 6 is a cross-sectional view of the book deposit of FIG. 5 taken along section lines 6—6, showing the book deposit casement and book return door in a closed position.
Figure 8:
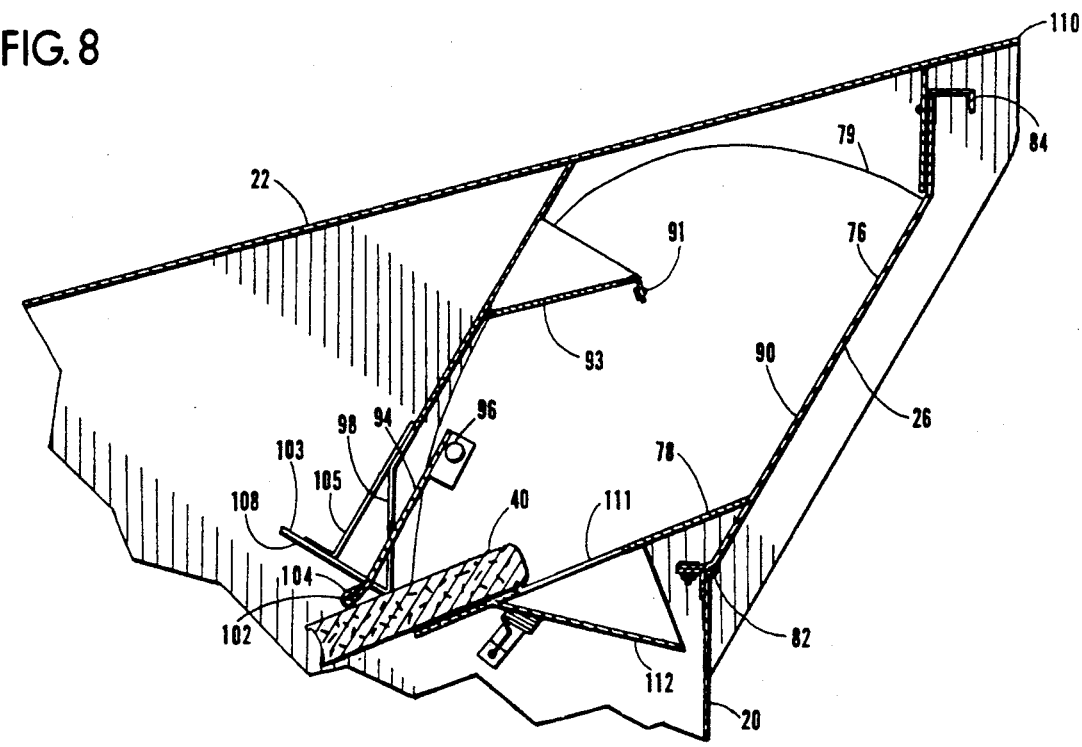
FIG. 8 is a cross-sectional view of the book deposit of FIG. 6 with the book deposit door closed showing a book passing through rear gate.

As best shown in FIGS. 6-10, the sector-shaped door 26, together with the casement 22 and a gate 94, functions to admit books when the container 28 is partially filled, but locks against further deposits when the container is full. The sector-shaped door 26 has a first surface 76 and a second surface 78, and upright sides 79, angled from one another which together with the casement 22 form a compartment 80. The sector-shaped door is horizontally pivotal about the horizontal pivot 82 between an open position as shown in FIG. 7 and a closed position as shown in FIGS. 6 and 8. The pivot 82 is preferably a hinge which connects the door 26 to the casement 22. The door 26 has a door handle 84 by means of which a depositor may open the door 26 to expose a front opening 86 in the casement 22 into which books 40 may be deposited. The first surface 76 is angled from the second surface 78 such that when the door is opened the first surface forms a generally horizontal shelf for the convenient placement of books, as seen in FIG. 7. The second surface extends upwardly away from the first surface, together with the gate 94 blocking access through the rear opening 92. Door return springs 88, best shown in FIG. 5, are mounted between brackets 89 which are affixed to the casement 22 and the sides 79 of the door 26. The springs 88 cause the sector-shaped door 26 to close when the door handle 84 has been released. The bumper 91 mounted on the bumper bracket 93 limits the travel of the sector-shaped door, and brings it to a stop in the open position. A book guide surface 90 is formed by the first surface 76 and the second surface 78 which, when the door 26 is closed, inclines generally downward towards the rear opening 92. A book 40 placed by a depositor on the guide surface when the sector-shaped door is in the open position (see FIG. 7) will slide down the guide surface 90 through the rear discharge opening 92 when the door 26 is closed, as shown in FIG. 8.

The rear discharge opening 92 is covered by a gate 94 which is mounted on a horizontal pivot 96 so as to block the rear discharge opening 92 when the gate 94 is closed. The gate 94 has attached to it a guide bar or guide tabs 102. The guide tabs 102 may be an attached bar or, as in the preferred embodiment, a stiffened extended portion formed by doubling over the metal of the gate 94.

When the door 26 is open or partly open the gate 94, by means of the attached guide tabs 102 is prevented from opening by an inner guide surface 98 which in the preferred embodiment is the inner surface of a baffle 99 which is part of the casement 22. The inner guide surface 98 is formed by that part of the casement 22 that surrounds the rear opening 92. This surface is spaced from the door 26 and does not interfere with the door throughout its range of motion. This surface 98 is also cut away so that in the closed position the gate 94 can freely swing open allowing books 40 to pass through.

When the door 26 is opened the inner guide surface 98 is so closely spaced from the gate 94 and the guide tabs 102 that the gate 94 cannot be lifted by an inserted hand or finger or other object to reveal the rear opening 92. As a result, when the door 26 is opened, nothing can pass through into the interior chamber 100 of the chest 20.

Figure 9:
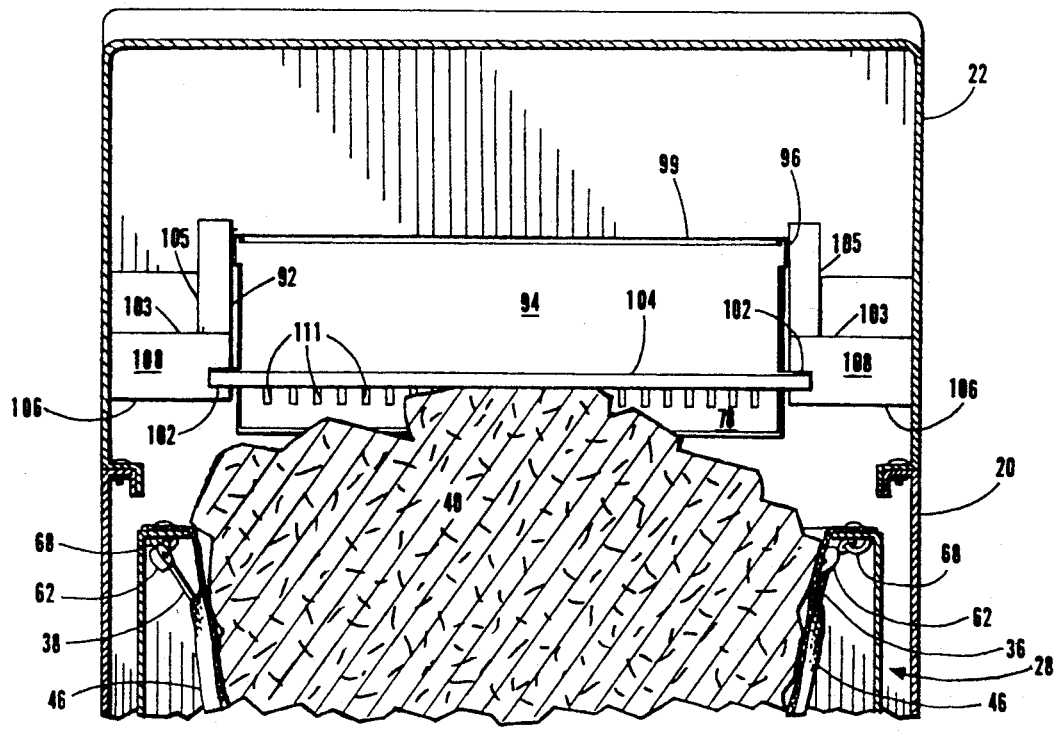
FIG. 9 is a rear elevational view of the book deposit of FIG. 5 taken along section lines 9—9, showing the deposit container full, and the deposit door locked.
Figure 10:
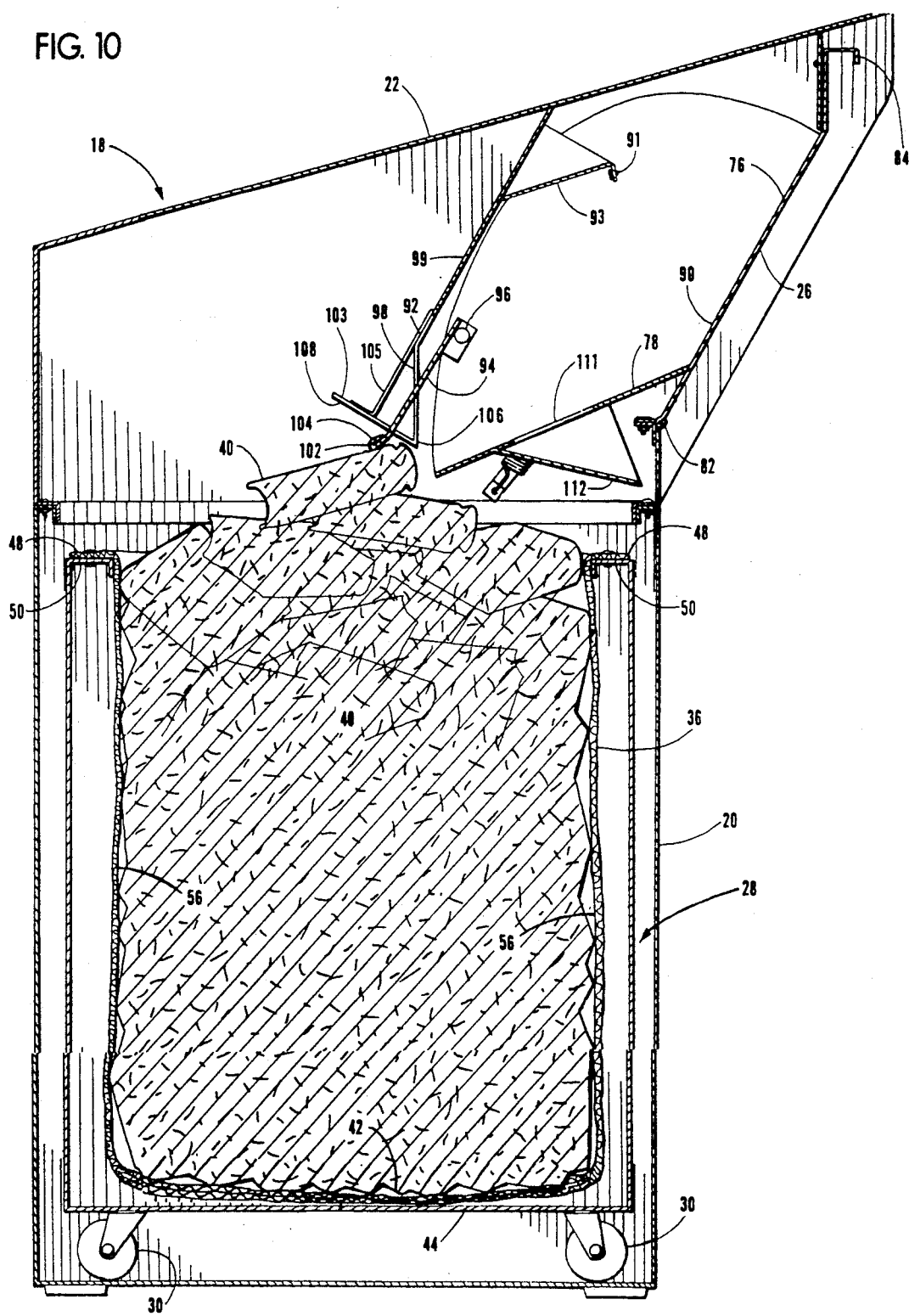
FIG. 10 is a cross-sectional view of the locked book return of FIG. 9.

An outer guide surface 108 is formed by an upward extension from the casement 22. The outer guide surface may be formed by triangular plates fixed on either side of the rear opening 92 to engage the guide tabs 102 when the container 28 is full, or preferably will be a rigid plate extension 103 on either side of the rear opening 92 which may be additionally stiffened by the provision of a welded stiffening bracket 105 extending between the casement 22 and the rigid plate extension 103. The guide tabs 102 extend from the edge of the gate 104 so that when the gate 94 is held open by a book 40, as shown in FIGS. 8-10, the gate guide tabs 102 are forced past the apex 106 where the outer guide surface 108 joins the inner guide surface 98 pushing the gate up along the outer guide surface 108. When the guide tabs 102 of the gate 94 are blocked from upward and forward movement by the outer guide surface 108, significant opening of the door 26 is prevented. Any attempt to open the door 26 would then result in the tabs 102 and hence the gate 94 being held up by the plate extensions 103. Forward motion of the gate 94 and the door 26 to which the gate is connected is then no longer possible. Although a slight opening may be possible before the guide tabs 102 engage the outer guide surfaces 108, the casement overhang 110 prevents any access to the chamber 80 formed by the sector-shaped door.

There are thus two instances when the return 18 will be locked against opening the door 26. During operation, as shown in FIG. 8, after the door 26 has been released by the depositor the book 40, while sliding from the book guide surface 90 into the bag 36, will momentarily deflect the gate 94 upwards and the door 26 will be prevented from opening. Once the deposited book has passed through the discharge opening 92 the door will be again free to open.

It is important to note, however, that if the book 40 is prevented from passing fully through the discharge opening 92, as shown in FIG. 9, or is prevented from passing fully from under the gate 94, the return will be permanently locked until the container 28 is removed from the chest 20. The door 26 will be so blocked if the container 28 is so fully loaded that the previously deposited books themselves block further entry of books.

The return 18 of this invention thus prevents its excessive loading. A facility which has heavy return use can thus place two or more returns in a common location so that a depositor, instantly alerted to the fullness of one return by its resistance to opening, may deposit his book in a neighboring return.

Drip holes 111 are provided in the door 26 which pass any moisture which enters the sector-shaped door through the guide surface 90 and by means of a drip baffle 112 deflect the water from the removable book container 28. The overhang 110 in addition to preventing access to the sector-shaped door unless it opens fully also functions as a rain shield preventing water from entering the sector-shaped door when it is closed.

The gate 94 blocking the rear opening 92 of the sector-shaped deposit door 26 may be biased in such a way that very light objects, such as a book of lit matches, will not pass through to the book storage container 28 and so will harmlessly extinguish itself within the confines of the sector-shaped door 26.

It should be noted that the casement, door, guide surface, gate and tab assembly of the book return of this invention may equally well be fitted to a wall-mounted book return for passage of books through a wall into a receiving bin. Although the removable container and the collapsible bag have been shown to have a rectangular plan, polygonal and cylindrical bags and like-shaped containers may also be employed.

The removable book container 28 best shown in FIG. 2 may be used as a transportable book truck. As a book truck, the container 28 is ideal for use under circulation desks or with built-in book returns. When used as a book truck or cart, the container 28 holds up to twice as much material as conventional carts of similar size and so need not be emptied as often. The four wheels 30 will preferentially be 3 inch caster wheels, two of which are fixed and two of which are swivel locking. The wheels in combination with the fold down handle 32 make the cart easy to maneuver, whether it is full or empty. Thus the container 128 may be readily maneuvered around study carrels and desks to collect books for reshelving.

Figure 11:
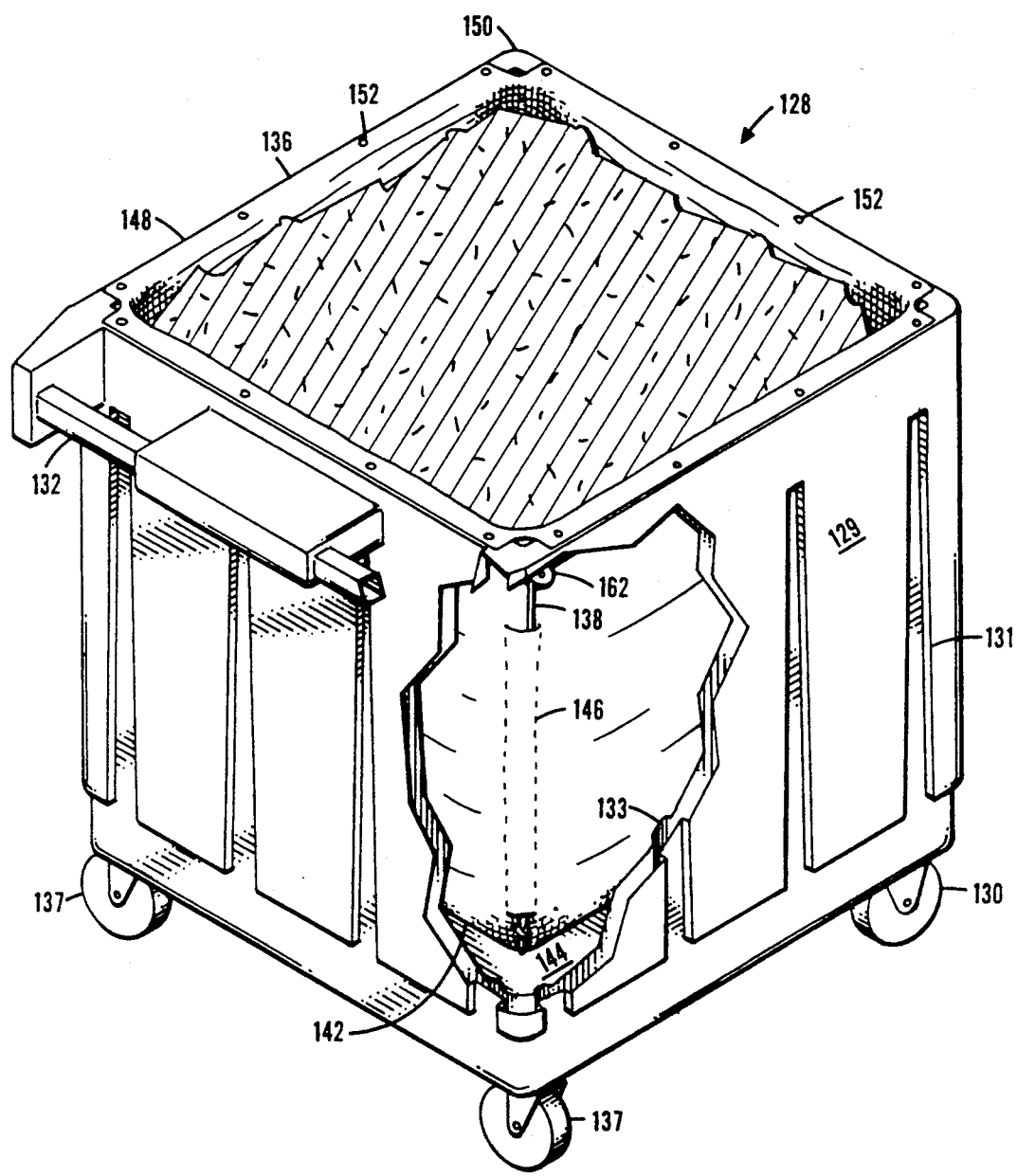
FIG. 11 is a perspective view of the book truck of this invention with the book truck side walls partly removed and cut away to show a collapsible container therein.

The book truck 128 shown in FIG. 11 is similar to the receptacle 28 but is specifically designed to function as a book truck. It is preferably made of molded high-density polyethylene construction, which is resistant to abrasion, cracking and denting. The book truck 128 has double side walls 129 approximately ¼ inch thick. The side walls 129, 135 have outer ribs 131 for strengthening the outer walls 129, and inner ribs 133 for strengthening the inner walls 135. The book truck 128 is mounted on four inch duPont ®, Delrin ®-bearing casters, 130, 137. Two of the wheels 130 are fixed and two of the wheels 137 swivel. Holes (not shown) are provided in the bottom 144 of the book truck 128 to provide drainage of the book truck 128 should moisture enter the container 128. Because the book truck 128 is not contained within a book return, it is fabricated with an integral handle 132 to assure easy maneuvering of the book truck 128 whether loaded or unloaded. The integral handle 132 and the fold down handle 32 function as means for grasping the book receptacle 28 and book truck 128.

Books 140 whether from a book drop under a circulation desk or as collected from various library tables and study carrels are loaded into the collapsible book container 36. The collapsible book container 136 is a rugged nylon bag which is supported on elastic cords 138 which hold the collapsible bag 136 in a substantially collapsed position when it is not loaded with books.

The collapsible bag 136 is in all ways similar to the collapsible bag 36. The elastic cords are contained in cloth sleeves 146 and are attached at the bottom 142 of the bag to a rigid frame (not shown) similar to the rigid frame 74 shown in FIG. 5. The collapsible bag 136 is attached to the upper edge 150 of the book truck 128 by means of snaps 152 located at the upper edges 148 of the collapsible container 136. The collapsible container 136 as shown in FIG. 11 employs pulley blocks 162 attached to corner brackets which permit the use of flexible cords of greater length than the depth of the book truck 128 hence affording a greater degree of flexible extension for a cord of a particular elasticity.

Thus it is understood that the book receptacle 28 and the book truck 128 together with the collapsible bags 36, 136 function as book carts or trucks of increased capacity and ease of loading and unloading as facilitated by the elastic support means 38, 138.

It is understood that the invention is not confined to the particular construction or arrangement of parts herein illustrated and described, but embraces such modified forms thereof as come within the scope of the following claims.

I claim:
1. A book receptacle comprising:
   (a) a support structure defining a volume open at the top and having an upper peripheral edge;
   (b) a collapsible container having a bottom which, in the uncollapsed state, substantially fills the volume defined by the support structure, the collapsible container being open at the top and having an upper peripheral edge which si affixed to the support upper peripheral edge;
   (c) an elastic load responsive support, extending from a first attachment point located at the bottom of the collapsible container through a pulley attached to the support structure upper edge over which it turns and extends to a second attachment point located on the support structure and spaced a fixed distance from the pulley, such that the length of the support extending between the pulley and the second attachment point remains fixed as the bottom is depressed, and wherein the collapsible container is held in a substantially collapsed condition by the load responsive support when the container is empty and as the container is loaded with books expands to fill substantially the volume defined by the support structure;

(d) a handle connected to the support structure and adapted to be grasped by a suer for movement of the book receptacle.

2. The book receptacle of claim 1 wherein the collapsible container is a flexible fabric bag.

3. The book receptacle of claim 2 wherein the bottom of the bag is held extended by a frame which holds the bottom of the collapsible gag in a substantially planar configuration.

4. A book receptacle comprising:
(a) a support structure defining a volume open at the top and having an upper peripheral edge;
(b) a collapsible container having a bottom which, in the uncollapsed state, substantially fills the volume defined by the support structure, the collapsible container being open at the top and having an upper peripheral edge which is affixed to the support upper peripheral edge;
(c) an elastic cord extending from a first attachment point located at the bottom of the collapsible container through a pulley attached to the support upper edge over which it turns at an angle of approximately 90° and extends to a second attachment point located on the support structure and spaced form the pulley, wherein the cord is attached at its second attachment point to an attachment bracket located on the support upper edge, and wherein the collapsible container is held in a substantially collapsed condition by the cord when the container is empty and as the container is loaded with books expands to fill substantially the volume defined by the support structure;
(d) a handle connected to the support structure and adapted to be grasped by a user for movement of the book receptacle.

5. A transportable book truck comprising:
(a) a support structure defining a volume open at the top and having a bottom and an upper peripheral edge;
(b) a collapsible container having a bottom, wherein the container in the uncollapsed state substantially fills the volume defined by the support structure, the collapsible container being open at the top and having an upper peripheral edge which is fixed to the support structure upper peripheral edge;
(c) an elastic load responsive support extending from a first attachment point located at approximately the bottom of the collapsible container through a pulley attached to the support structure upper edge over which it turns and extends to a second attachment point located on the support structure and spaced a fixed distance form the pulley, such that the length of the support extending between the pulley and the second attachment point remains fixed as the bottom is depressed, and wherein the collapsible container is held in a substantially collapsed condition by the load responsive support when the container is empty and as the container is loaded with books expands to fill substantially the volume defined by the support structure; and
(d) a plurality of wheels rotatably mounted to the support structure so that book truck is adapted for easy motion over a surface.

6. The book truck of claim 5 further comprising a handle rigidly mounted to the support structure and adapted for grasping to move the book truck over a surface.

7. The book truck of claim 5 wherein the collapsible container is a flexible fabric bag.

8. The book truck of claim 7 wherein the bottom of the bag is held extended by a frame which holds the bottom of the collapsible bag in a substantially planar configuration.

9. A collapsible bag for a book truck having a support structure with an upper peripheral edge to which a plurality of pulleys are attached and a plurality of elastic load responsive supports, each support extending from an attachment point on the support structure a fixed distance from a pulley, and each load responsive support extends over a pulley and is connected to the bag such that the length of the support extending from the attachment point to the pulley remains fixed as the bag bottom is depressed, the bag comprising:
(a) a cloth bag defining a volume open at the top, the bag having four sides, a bottom and an upper edge;
(b) a plurality of fasteners located on the upper edge of the bag adapted to fasten the bag to the book truck support structure;
(c) a cloth surface attached to the bottom of the bag defining a pocket into which may be installed a stiffening frame for the purpose of holding the bottom of the bag substantially flat;
(d) four sleeves attached to the corners of the bag defined by adjacent sides, each sleeve being adapted to containing and guiding a book truck elastic load responsive support; and
(e) reinforcing straps attached to the bag bottom and having attachment points closely spaced from the sleeves for attachment to the elastic load responsive supports running in the sleeves to permit the bag bottom to be supported by the elastic load responsive supports.

* * * * *